(12) United States Patent
Huie

(10) Patent No.: US 9,063,575 B2
(45) Date of Patent: Jun. 23, 2015

(54) DETECTING A GESTURE

(71) Applicant: Synaptics Incorporated, Santa Clara, CA (US)

(72) Inventor: Mark Andrew Huie, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 260 days.

(21) Appl. No.: 13/722,870

(22) Filed: Dec. 20, 2012

(65) Prior Publication Data

US 2014/0176448 A1 Jun. 26, 2014

(51) Int. Cl.
*G06F 3/041* (2006.01)
*G06F 3/01* (2006.01)
*G06F 3/0488* (2013.01)

(52) U.S. Cl.
CPC .............. *G06F 3/017* (2013.01); *G06F 3/0488* (2013.01); *G06F 2203/04808* (2013.01)

(58) Field of Classification Search
CPC .................. G06F 3/017; G06F 3/0488; G06F 2203/04808
USPC ........................................................ 345/173
See application file for complete search history.

(56) References Cited

U.S. PATENT DOCUMENTS

| | | | |
|---|---|---|---|
| 7,030,861 B1 | 4/2006 | Westerman et al. | |
| 7,619,618 B2 | 11/2009 | Westerman et al. | |
| 7,663,607 B2 | 2/2010 | Hotelling et al. | |
| 8,407,606 B1 * | 3/2013 | Davidson et al. | 715/754 |
| 8,542,206 B2 | 9/2013 | Westerman et al. | |
| 2002/0036618 A1 * | 3/2002 | Wakai et al. | 345/157 |
| 2008/0180405 A1 * | 7/2008 | Han et al. | 345/173 |
| 2009/0278812 A1 | 11/2009 | Yasutake | |
| 2010/0201616 A1 * | 8/2010 | Choi et al. | 345/156 |
| 2011/0026186 A1 | 2/2011 | Katsumura et al. | |
| 2011/0074809 A1 * | 3/2011 | Chen et al. | 345/619 |
| 2012/0015625 A1 | 1/2012 | Mendenhall et al. | |
| 2012/0091862 A1 | 4/2012 | Link et al. | |
| 2012/0166175 A1 | 6/2012 | Kopparapu | |

* cited by examiner

*Primary Examiner* — Jonathan Boyd
(74) *Attorney, Agent, or Firm* — Osha Liang LLP

(57) ABSTRACT

A method for detecting a gesture includes detecting a first input object, a second input object, and a movement of the first input object, a movement of the second input object in a sensing region during a first time period. The method further includes detecting a third input object and movement for the third input object in the sensing region during a second time period, the second time period occurring after the first time period, and the third input object only detected after the first time period. The method further includes identifying a first gesture based on the movement of the first input object, the movement of the second input object, and the movement of the third input object, and outputting gesture information identifying the first gesture.

19 Claims, 9 Drawing Sheets

DETECTING A GESTURE

FIELD OF THE INVENTION

This invention generally relates to electronic devices.

BACKGROUND

Input devices including proximity sensor devices (also commonly called touchpads, touch screens, or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, the invention relates to a method for detecting a gesture that includes detecting a first input object, a second input object, and a movement of the first input object, a movement of the second input object in a sensing region during a first time period. The method further includes detecting a third input object and movement for the third input object in the sensing region during a second time period, the second time period occurring after the first time period, and the third input object only detected after the first time period. The method further includes identifying a first gesture based on the movement of the first input object, the movement of the second input object, and the movement of the third input object, and outputting gesture information identifying the first gesture.

In general, in one aspect, the invention relates to a processing system for a sensing device that includes a sensor module and a determination module. The sensor module includes sensor circuitry coupled to sensor electrodes. The sensor module includes functionality to drive the sensor electrodes to sense input objects in a sensing region of the sensing device. The determination module includes functionality to detect a first input object, a second input object, and a movement of the first input object, a movement of the second input object in the sensing region during a first time period. The determination module further includes functionality to detect a third input object and movement for the third input object in the sensing region during a second time period, the second time period occurring after the first time period, and the third input object only detected after the first time period. The determination module further includes functionality to identify a first gesture based on the movement of the first input object, the movement of the second input object, and the movement of the third input object, and output gesture information identifying the first gesture.

In general, in one aspect, the invention relates to a non-transitory computer readable medium for detecting a gesture, comprising computer readable program code embodied therein for detecting a first input object, a second input object, and a movement of the first input object, a movement of the second input object in a sensing region during a first time period, and detecting a third input object and movement for the third input object in the sensing region during a second time period, the second time period occurring after the first time period, and the third input object only detected after the first time period. The computer readable program code further includes functionality for identifying a first gesture based on the movement of the first input object, the movement of the second input object, and the movement of the third input object, and outputting gesture information identifying the first gesture.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Various embodiments of the present invention provide input devices and methods that facilitate improved usability. Specifically, embodiments of the invention provide a method and system for detecting a gesture. In one or more embodiments of the invention, the gesture is detected based on at least three input objects on a sensing region whereby the input objects required for performing the gesture are not all in the sensing region during the entire gesture. For example, a input object may be added to the sending region after the start of the gesture.

In the following description, the term "gesture" means a defined movement of input objects on a sensing region (discussed below and in FIG. 2). Specifically, the gesture is defined in a processing system, such that the processing system can detect the gesture when the gesture is performed by a user. In one or more embodiments of the invention, the movement is defined as having all input objects on the sensing region during the entire gesture. In other words, with a large enough sensing region, the gesture may be completed without any input object halting, temporarily or permanently, physical contact with the sensing region. Thus, such gestures, may exclude, for example, gestures that are completed by tapping on the sensing region. In one or more embodiments of the invention, by being able to detect a gesture that is defined as having at least three input objects to be detected during the entire gesture, when not all input objects are detected during the entire gesture, embodiments provide a mechanism for effecting increasing the size of the sensing region.

Figure 1:
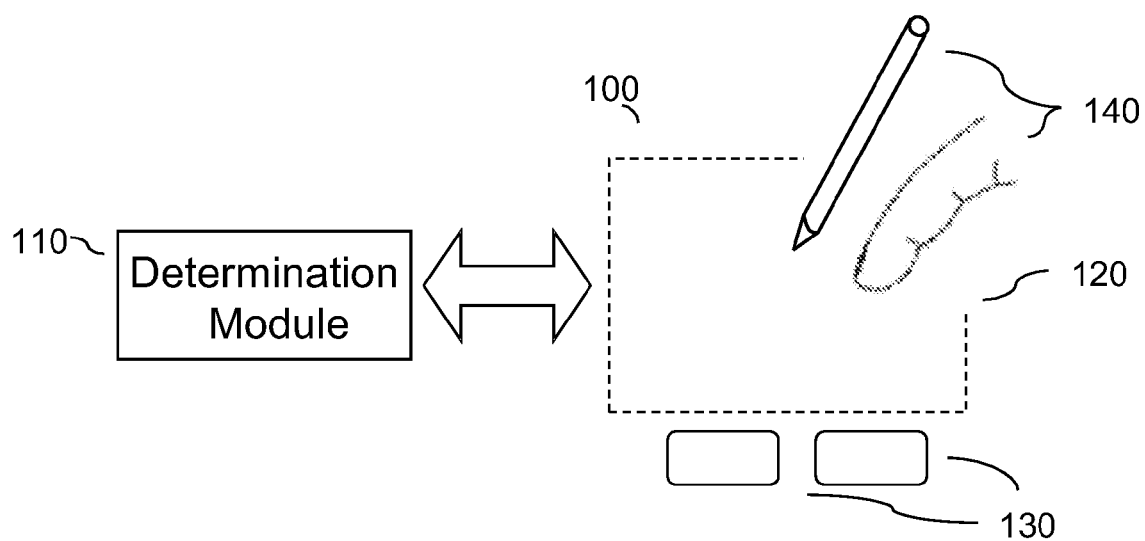
FIGS. 1-2 are a block diagram of an exemplary system that includes an input device in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, smart phones, e-book readers, and personal digital assistants (PDAs). Additional example electronic systems include composite input devices, such as physical keyboards that include input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, digital cameras, and the like). Additionally, the electronic system could be a host or a slave to the input device (100).

The input device (100) can be implemented as a physical part of the electronic system, or can be physically separate from the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad", "touchscreen", or a "touch sensor device") configured to sense input provided by one or more input objects (140) in a sensing region (120). Example input objects include fingers and styli, as shown in FIG. 1.

Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment. In some embodiments, the sensing region (120) extends from a surface of the input device (100) in one or more directions into space until signal-to-noise ratios prevent sufficiently accurate object detection. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which sensor electrodes or other sensor modules reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a determination module (110) may be a part of or operatively connected to the input device (100). In one or more embodiments of the invention, the determination module (110) may include functionality to detect one or more input objects in the sensing region and identify a gesture being performed in the sensing region by movement of the input objects. The determination module (110) may be configured to operate the hardware of the input device (100) to detect input in the sensing region (120) in one or more embodiments of the invention. The determination module (110) includes parts of or all of one or more integrated circuits (ICs) and/or other circuitry components. For example, a determination module for a mutual capacitance sensor device may include transmitter circuitry configured to transmit signals with transmitter sensor electrodes, and/or receiver circuitry configured to receive signals with receiver sensor electrodes). In some embodiments, the determination module (110) also includes electronically-readable instructions, such as firmware code, software code, and/or the like. In some embodiments, components composing the determination module (110) are located together, such as near sensing element(s) of the input device (100). In other embodiments, components of determination module (110) are physically separate with one or more components close to sensing element(s) of input device (100), and one or more components elsewhere. For example, the input device (100) may be a peripheral coupled to a desktop computer, and the determination module (110) may include software configured to run on a central processing unit of the desktop computer and one or more ICs (perhaps with associated firmware) separate from the central processing unit. As another example, the input device (100) may be physically integrated in a phone, and the determination module (110) may include circuits, firmware, software, or a combination thereof that are part of a main processor of the phone. In some embodiments, the determination module (110) is dedicated to implementing the input device (100). In other embodiments, the determination module (110) also performs other functions, such as operating display screens, driving haptic actuators, etc.

The determination module (110) may be implemented as a set of modules that handle different functions of the determination module (110). Each module may include circuitry that is a part of the determination module (110), firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the determination module (110) responds to user input (or lack of user input) in the sensing region (120) directly by causing one or more actions. Example actions include changing operation modes, as well as graphical user interface (GUI) actions such as cursor movement, selection, menu navigation, and other functions.

In some embodiments, the determination module (110) provides information about the input (or lack of input) to some part of the electronic system (e.g. to a central processing system of the electronic system that is separate from the determination module (110), if such a separate central processing system exists). In some embodiments, some part of the electronic system processes information received from the determination module (110) to act on user input, such as to facilitate a full range of actions, including mode changing actions and GUI actions.

For example, in some embodiments, the determination module (110) operates the sensing element(s) of the input device (100) to produce electrical signals indicative of input (or lack of input) in the sensing region (120). The determination module (110) may perform any appropriate amount of processing on the electrical signals in producing the information provided to the electronic system. For example, the determination module (110) may digitize analog electrical signals obtained from the sensor electrodes. As another example, the determination module (110) may perform filtering or other signal conditioning. As yet another example, the determination module (110) may subtract or otherwise account for a baseline, such that the information reflects a difference between the electrical signals and the baseline. As yet further examples, the determination module (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the determination module (110) or by some other determination module. These additional input components may provide redundant functionality for input in the sensing region (120), or some other functionality. FIG. 1 shows buttons (130) near the sensing region (120) that can be used to facilitate selection of items using the input device (100). Other types of additional input components include sliders, balls, wheels, switches, and the like. Conversely, in some embodiments, the input device (100) may be implemented without other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. As another example, the display screen may be operated in part or in total by the determination module (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the determination module (110)). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
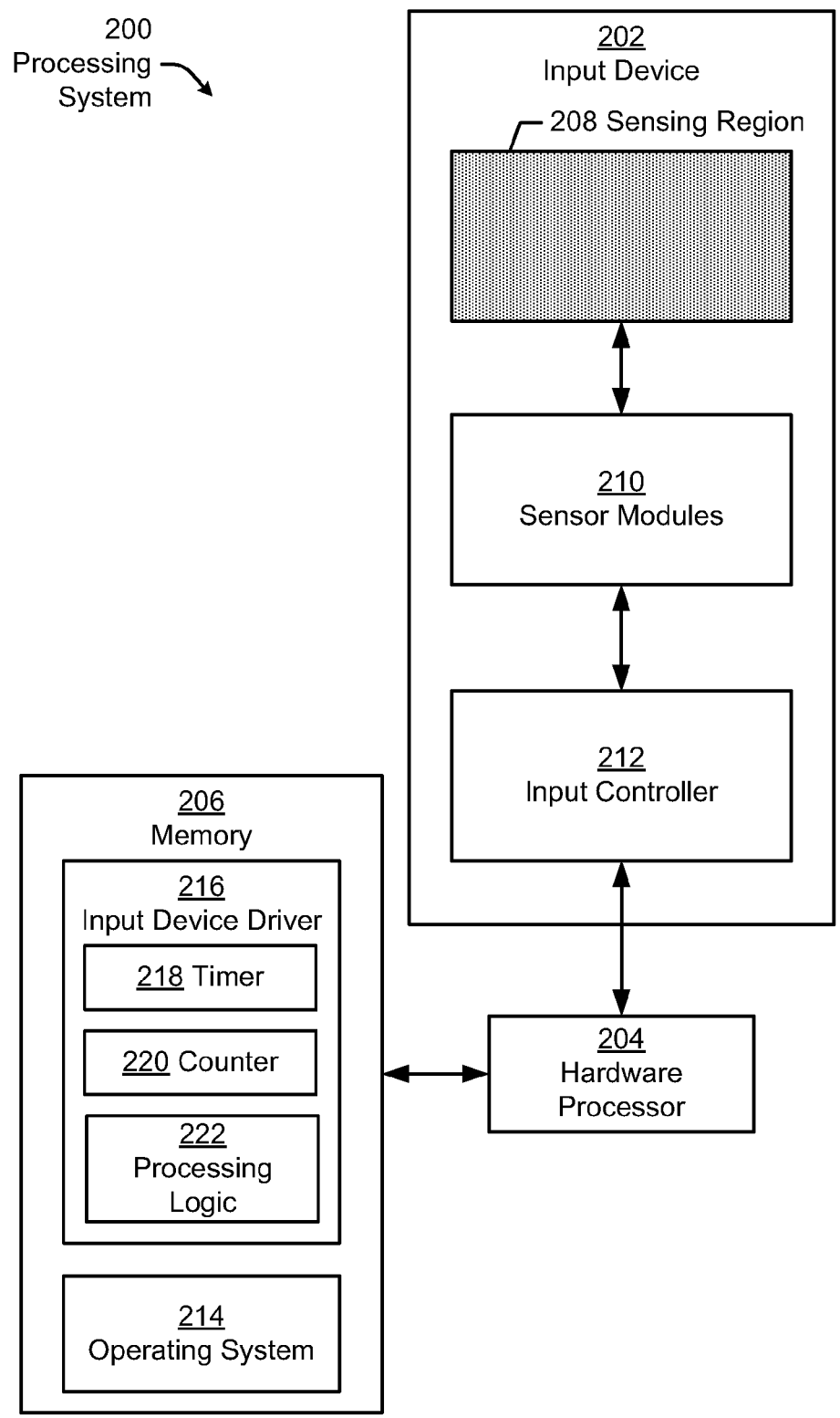

FIG. 2 shows a schematic diagram of a processing system (200) in one or more embodiments of the invention. The processing system (200) may correspond to all or a portion of the components shown in FIG. 1. Further, the determination module (e.g., determination module (110) in FIG. 1) may correspond to the input device driver (216), input controller (212), operating system (214), hardware processor (204), or a combination thereof without departing from the scope of the claims. Further, the electronic system discussed above may include, for example, a hardware processor (204) and memory (206) shown in FIG. 2.

As shown in FIG. 2 the processing system (200) includes a input device (202), a hardware processor (204), and memory (206), in one or more embodiments of the invention. Each of these components is discussed below.

In one or more embodiments of the invention, the input device (202) corresponds to the input device (100) discussed above and found in FIG. 1. Continuing with the discussion of FIG. 2, the input device (202) includes a sensing region (208), sensor electrodes (210), and an input controller (212). A sensing region (208) corresponds to the sensing region (120) discussed above and found in FIG. 1. Continuing with the discussion of FIG. 2, in one or more embodiments of the invention, sensor electrode(s) (210) correspond to one or more hardware components that include functionality to directly detect an input object on the sensing region and issue a signal upon the detection.

Continuing with the discussion of FIG. 2, an input controller (212) corresponds to hardware and/or firmware that acts as an interface between the input device (202) and the hardware processor (204). Specifically, the input controller (212) includes functionality to receive the signal from the sensor electrode(s) (210) and transmit an interrupt to the hardware processor (204). The interrupt may include positional information, discussed above, based on the signal from the sensor electrode(s) (210) (e.g., based on the location of one or more sensor electrodes that issued the signal). A hardware processor (204) corresponds to hardware components with functionality to execute software instructions. For example, the hardware processor may correspond to a central processing unit (CPU), a multi-core processor, a single core of a multi-core processor, or multiple processors. In one or more embodiments of the invention, the hardware processor (204) is operatively connected to memory (206). Memory (206) corresponds to storage for instructions and/or data. Specifically, the hardware processor (204) includes functionality to obtain instructions and/or data from memory (206) and execute the instructions and/or data. Memory (206) may include cache memory, memory modules, storage devices, or any other forms of memory.

In one or more embodiments of the invention, a memory (206) includes an operating system (214) and an input device driver (216). An operating system (214) is a collection of software that manages hardware resources of the electronic system and provides common services for application software. For example, the operating system (214) includes functionality to control which application(s) may use the resources of the computer system. In one or more embodiments of the invention, the operating system (214) includes functionality to receive a notification of a completed gesture. The operating system (214) may further include functionality to perform an action defined by the completed gesture or notify an application to perform the action.

In one or more embodiments of the invention, the operating system (214) is connected to the input device driver (216). Specifically, the input device driver (216) acts as a software intermediary between the input device (202) and the operating system (214). The input device driver (216) includes functionality to receive an interrupt from the input controller (212) and perform an action according to the interrupt. In the embodiments shown in FIG. 2, the input device driver (216) corresponds to a determination module for detecting at least three input object gestures. In such a scenario, the input device driver (216) may include one or more of a timer (218), a counter (220), and processing logic (222).

Continuing with FIG. 2, a timer (218) corresponds to logic that tracks when the end of a specified amount of time has elapsed. As an example, in one or more embodiments, a three input object gesture may have a limited time frame to be completed. The timer (218) includes functionality to maintain the time that elapses as the gesture is being performed. A timer expires when the time that elapses exceeds a limit for completing the gesture. Each gesture may have a separate or uniquely defined time limit. For example, some gestures in the group may have a different defined time limit while other gestures have the same time limit defined for the gesture. Alternatively, all gestures may have the same time limit. The timer (218) may be configured to count up or count down in accordance with one or more embodiments. In alternative embodiments, the timer (218) may not exist or may not be used.

In one or more embodiments, a counter (220) includes functionality to maintain a count of a total number of input objects on the sensing region (208). Specifically, the counter stores a count representing a total number of input objects detected on the sensing region (208) during the time frame tracked by the timer. In one or more embodiments of the invention, the total number of input objects detected may or may not be present on the sensing region at the same time.

In one or more embodiments, the counter (220) and the timer (218) are operatively connected to processing logic (222). The processing logic (222) includes functionality to identify at least three input object gesture and other functionality as required in accordance with one or more embodiments of the invention. For example, the processing logic (222) may include functionality to obtain the positioning information, a count, an elapsed time, and detect gestures based on the aforementioned inputs. Functionality and methodologies to detect at least three input object gestures is discussed below in detail in relation to FIG. 4 and FIG. 6.

Although the input device driver (216) alone may be described as corresponding to the determination module (110 in FIG. 1), one or more of the operating system (214), input controller (212), and input device driver (216) may also correspond to the determination module (110 in FIG. 1). In such embodiments, the timer (218), counter (220), and processing logic (222) may each (or a portion thereof) correspond to hardware, software, firmware, or a combination thereof.

Figure 3:
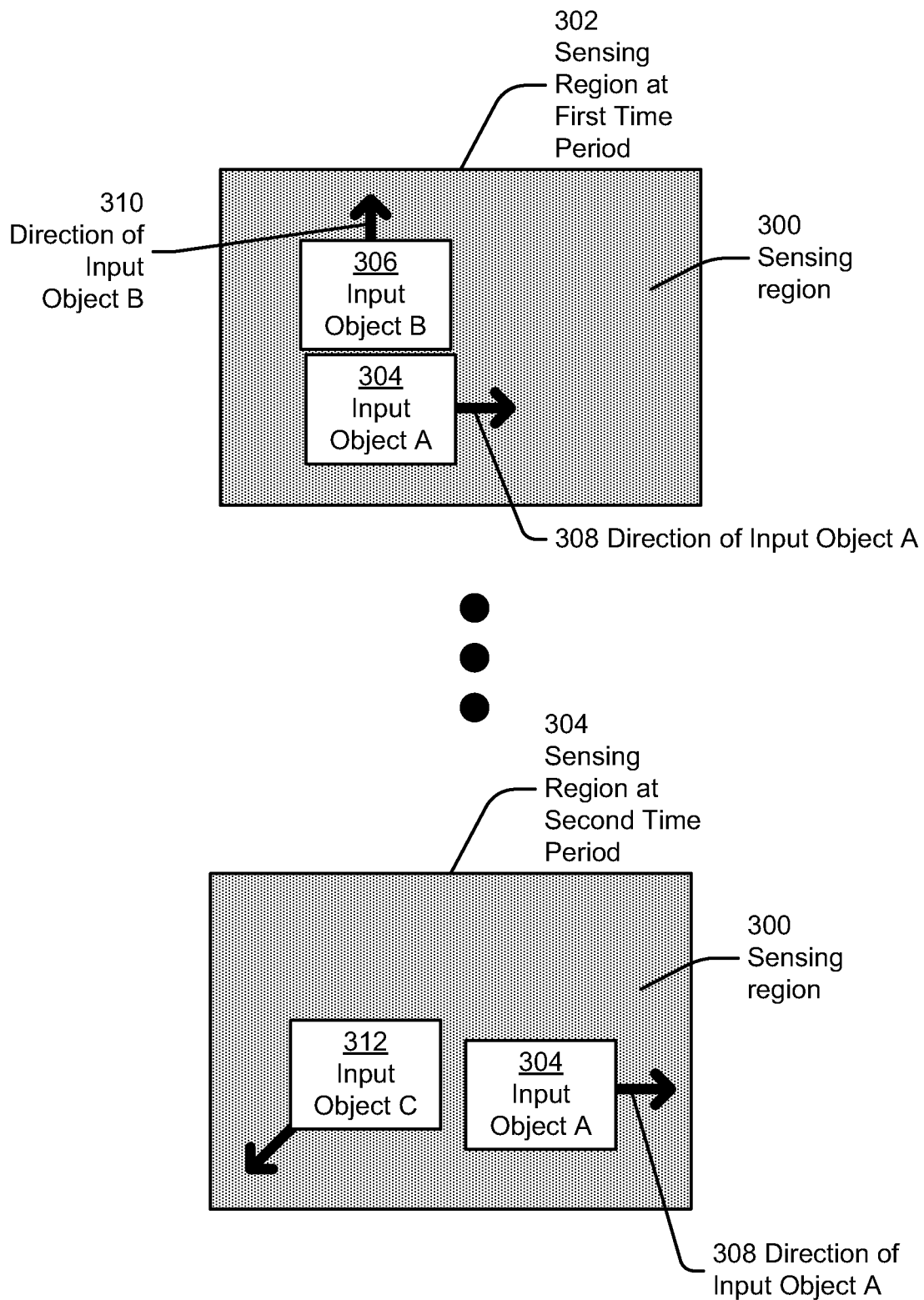
FIG. 3 shows a time-lapse diagram of the sensing region in accordance with one or more embodiments of the invention.

FIG. 3 shows a time-lapse diagram of the sensing region in accordance with one or more embodiments of the invention. In FIG. 3, three collinear dots mean that more time periods may optionally exist between the sensing region at a first time period (302) and the sensing region at a second time period (304). A time period corresponds to a continuous unit of time. A time period may be an exact moment in time (e.g., a snapshot in time) or may correspond to the length of time spanning from a starting point in time to an ending point in time. In one or more embodiments of the invention, a time period is short and spans less time than allowed to complete an intended gesture. Specifically, multiple time periods typically exist in order to complete an intended gesture.

In FIG. 3, a diagram of the sensing region (300) at a first time period (302) is shown. As shown in the diagram, input object A (304) is moving in one direction (308) (i.e. the direction of input object A) and input object B (306) is moving in another direction (310) (i.e. the direction of input object B). The determination module (110 in FIG. 1) with the controller (not shown) includes functionality to identify which direction each input object is moving.

The direction shown for the input objects is only for example purposes. Any direction corresponding to a defined gesture may be used without departing from the scope of the claims. In the example, the gesture is defined as requiring each of three input objects away from each other a certain distance. However, as shown in the example, the small size of the sensing region (300) and relatively large size of input objects prohibits the ability to include a third input object (e.g., input object C (312)) (which is required to complete the at least three input object gesture) when input object A (304) and input object B (306) are in the sensing region (300) at the start of the gesture.

A diagram of the sensing region (300) at a second time period (304) is shown in FIG. 3. As shown in FIG. 3, in order to complete the gesture, input object C (312) is added to the sensing region (300) in the position in which input object A (304) and input object B (306) were located. Further, assume that input object B (306) has completed input object B's portion of the gesture. Thus, input object B (306) is no longer detected on the sensing region at the second time period. The sensor electrodes and/or controller now stop detecting input object B (306) (i.e., input object B is removed from the sensing region), before, after, or at the same time that the sensor electrodes and/or controller start detecting input object C (312). In one or more embodiments of the invention, as long as input object A (304) and input object C (312) each complete their respective portions of the gesture before the timer expires, the determination module detects the example three input object gesture regardless of when each input object was detected on the sensing region (300). Thus, the size of the sensing region and the number of gestures that may be performed are effectively increased.

As discussed above, the gesture shown in FIG. 3 is for exemplary purposes only. Other gestures may be used without departing from the scope of the claims. Specifically, such other gestures may involve input objects or a portion of the input objects moving in the same direction or in different directions.

Figure 4:
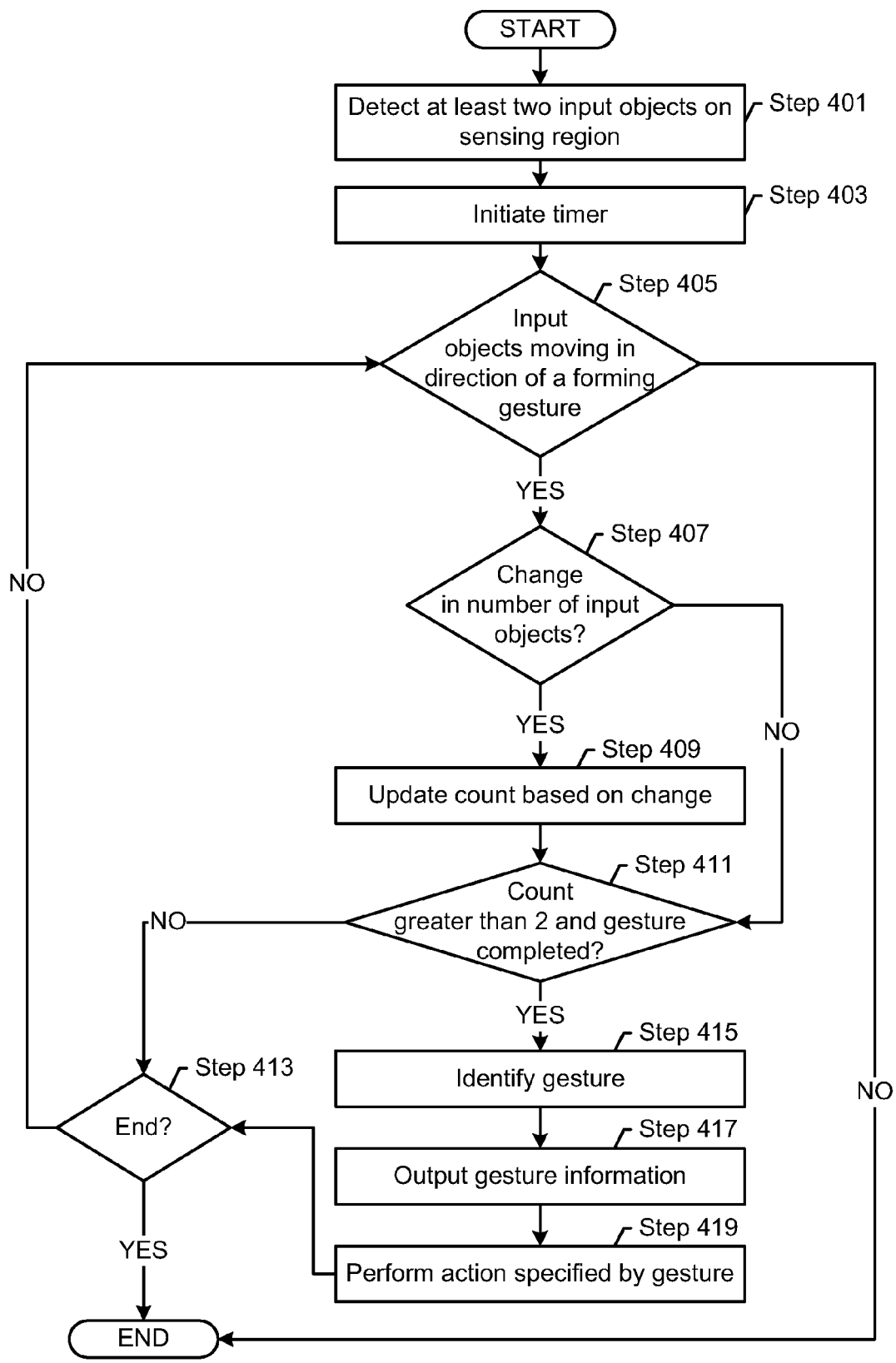
FIG. 4 show a flowchart in accordance with one or more embodiments of the invention.

FIG. 4 shows a flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that a condition exists in accordance with one or more embodiments of the invention. As another example, determination steps may be performed by performing a test, such as checking a data value to test whether the value is consistent with the tested condition in accordance with one or more embodiments of the invention.

In Step 401, at least two input objects are detected on the sensing region in accordance with one or more embodiments of the invention. The at least two input objects may be initially detected at the same time or one or more after another. For example, two input objects may be placed on the sensing region at the same time and detected at the same time. By way of another example, a first input object may be placed on the sensing region and detected and then a second input object may be placed on the sensing region, while the first remains on the sensing region. In the second example, when the second input object is placed on the sensing region at least two input objects are detected on the sensing region.

In one or more embodiments of the invention, detecting at least two input objects is performed when physical contact exists between the sensing surface and the input objects. Detecting the input objects may involve the sensor electrodes detecting the input objects and transmitting a signal to the controller. The controller may send an interrupt or other signal to the device driver. The signal from the controller may include positional information of the input objects with respect to the sensing region. Other methods than those described above may be used for detecting input objects on a sensing region and obtaining positional information of the input objects without departing from the scope of the claims. Further, if the controller or operating system is deemed to include the functionality of the determination module or performs part of the functionality of the determination module, the controller or operating system (as described in detail above) may perform the detection.

In Step 403, a timer is initiated in one or more embodiments of the invention. Initiating the timer may involve having the timer start counting up or counting down. Alternatively or additionally, when the timer is or uses a clock, initiating the timer may include obtaining a current time value from the clock.

In Step 405, a determination is made whether the input objects are moving in direction of a forming gesture in accordance with one or more embodiments of the invention. In one or more embodiments of the invention, determining whether input objects are moving in direction of a forming gesture may include comparing positional information with a collection of defined gestures that are recognized by the determination module. Specifically, a contingency group of possible gestures being formed may be created. Initially, the contingency group may include all gestures or a subset thereof. For example, the contingency group may only include a subset of gestures when some gestures cannot be performed based on the initial position of the input objects (e.g., gestures that are defined as input objects moving upward on the sensing region are excluded when the input objects are initially detected at the top of the sensing region). As the positional information is received, gestures that require movement in a different direction than specified by the positional information may be eliminated from the contingency group to create a revised contingency group. In such embodiments, determining whether input objects are moving in direction of a forming gesture may include determining whether any gestures remain in the contingency group.

If input objects are not moving in direction of a forming gesture, then the method may end in one or more embodiments of the invention. Otherwise, in Step 407, a determination is made whether a change in the number of input objects is detected. The determination in Step 407 may be made in response to determining that input objects are moving in direction of a forming gesture. Alternatively, the determination in Step 407 may be independent of the determination in Step 405.

The determining in Step 407 may include determining whether a new input object is added, an existing input object is removed, or a previously removed input object is added. Determining whether a new input object is detected may be performed as follows in accordance one or more embodiments of the invention. In a scenario in which an existing input object moves on the sensing region from a position in which the new input object is detected, the determination module may include detecting that the existing input object moved to a new position (e.g., adjacent position) and then that another input object is on the sensing region at the position of the original input object. Alternatively or additionally, the determination module may include detecting a new input object in a position that is not located next to where the previous input object was detected.

Determining whether an input object is removed from the sensing region may be performed as described below. The determination may include a sensor electrode in which the input object was immediately earlier detected and any adjacent sensor electrodes do not detect the input object. In a scenario in which an existing input object moves on the sensing region to a position in which the removed input object is detected, the determination module may include logic to detect that the existing input object moved to removed input object position and then that the removed input object is no longer detected on the sensing region.

In one or more embodiments of the invention, the determination may be that a previously detected and removed input object is once again added to the sensing region. Such detection may be based on the last position of the input object on the sensing region and then detecting a new input object in the last position on the sensing region again. For example, consider the scenario in which an input object is detected as moving from the middle of the sensing region to the top of the sensing region and then no longer detected (i.e., detected as being removed). If a new input object is detected as being added at the top of the sensing region, then the determination module may determine that a previously detected and removed input object is once again added to the sensing region.

Continuing with FIG. 4, if the number of input objects changed, then the count is updated based on the change in one or more embodiments of the invention in Step 409. Specifically, if a new input object is detected, then the count is incremented. If an input object is removed, the count remains the same and positional information indicating the last place in which the input object is detected is stored in one or more embodiments of the invention. If a previously detected and removed input object is newly detected, then the count may not be updated, but the positional information may be stored to reflect the new detection of the input object.

In Step 411, a determination is made whether the count is greater than two and a gesture is completed in one or more embodiments of the invention. Specifically, the determination module may access the counter to obtain the current count. Although Step 411 describes determining whether the count is greater than two, the determination may be that the count is at least a specified number of input objects as defined by each gesture that is completed. The specified number of input objects may be three, four, five, six, etc. as defined by the gesture. Further, the determination module may compare positional information to determine whether any gestures are completed.

If the count is greater than two and a completed gesture is detected, then the gesture is identified in Step 415. In one or more embodiments of the invention, identifying the gesture may be performed by comparing all of the positional information with each of the defined gestures. Specifically, the totality of the positional information including positional information of removed input objects is compared against the set of defined gestures to identify the matching gesture.

In Step 417, gesture information of the identified gesture is transmitted as output in one or more embodiments of the invention. For example, if the controller is the determination module, then the controller may transmit the identified gesture to the input device driver. As another example, if the input device driver is the determination module, then the input device driver may transmit information identifying the gesture to the operating system. In one or more embodiments of the invention, if the operating system is the determination module, the portion of the operating system that identifies the gesture may transmit the information identifying the gesture.

In Step 419, the action specified by the gesture is performed in one or more embodiments of the invention. Specifically, based on the output of the gesture information, the action specified by the gesture is performed. In one or more embodiments of the invention, the operating system may perform the action.

Returning to Step 411, if the determination is made that the count is not greater than two and that a gesture is not identified, then the method may continue. In Step 413, a determination is made whether the method ends. For example, the method may end when the timer expired in one or more embodiments of the invention. Specifically, in one or more embodiments, the determination is made whether the maximum time allowed for any gesture has elapsed. If the maximum time allowed has elapsed (i.e. the timer has expired), the method may end. By way of another example, the method may end if the user stops performing a gesture. By way of another example, the method may end when the gesture does not match any possible gestures. Other reasons for the method to end may exist without departing from the scope of the invention.

If the flow does not end, the method may continue to Step 405 and receive positional information, update the count, and identify possible gestures. In embodiments in which each gesture has a separately defined maximum time, the determination may be based on which gesture's maximum time allowed has expired. The gestures which have the maximum allowed time expired may be removed from the contingency list.

Although FIG. 4 shows determining whether a gesture is being formed prior to completion of the gesture, rather than determining whether a gesture is being formed, embodiments may wait until after the timer expired, input objects are removed from the sensing region, or at another such time.

Further, although FIG. 4 may imply that a single gesture is possible and identified, in one or more embodiments of the invention, a gesture may be identified prior to completion of movement of input objects on the sensing region or expiration of the timer. For example, a contingency group may have multiple gestures. When a gesture in the contingency group is completed, then the gesture may be detected and the action specified the first detected gesture is performed even though other gestures exist in the contingency group. In such a scenario, if input objects are no longer detected on the sensing region or the timer expires, then the method may stop. However, if input objects are detected and remain moving consistent with another second gesture, then the method may continue until a determination is made that the second gesture is completed. In such a scenario, the action specified by the first gesture may be undone and the action specified by the second detected gesture may be performed. For example, the electronic device or software executing thereon may be rolled back to a state prior to the completion of the first detected gesture and the action specified by the second detected gesture may be performed. This process may continue until only a single gesture is possible, a timer expired, or another reason exists for the method to end.

Although FIG. 4 shows a gesture formed by at least three input objects, the gesture may be formed by two input objects in one or more embodiments of the invention. For example, the first input object may be placed on the sensing region and perform part of the gesture prior to being removed. After the first input object is removed in the example, a second and different input object may be placed on the sensing region and perform another part of the gesture. The second input object may complete the gesture or the gesture may be completed by the first input object in the example. In such a scenario, a third input object may be omitted.

Figure 5:
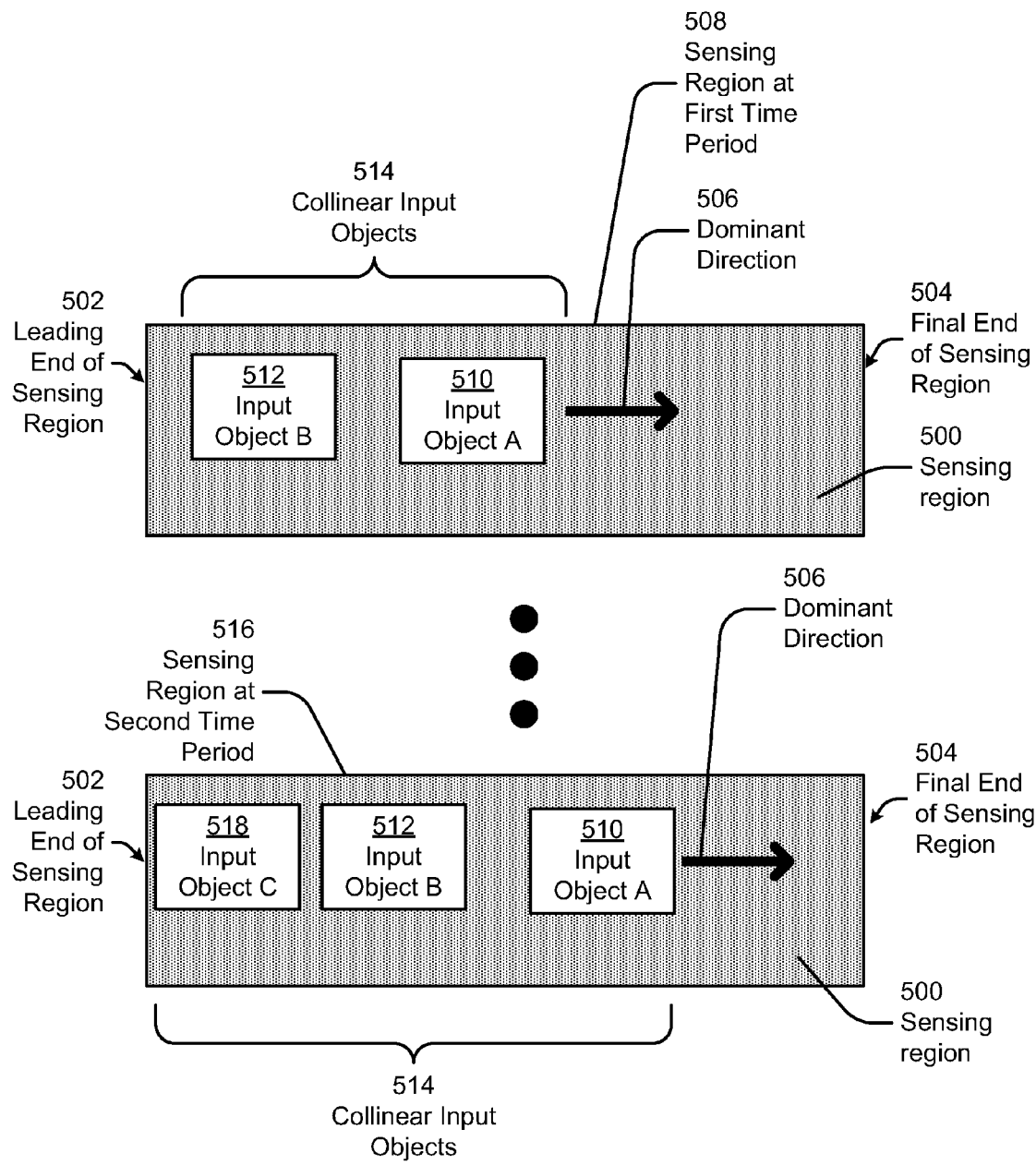
FIGS. 5 and 6 show an example of a swipe involving at least three inputs in accordance with one or more embodiments of the invention.
Figure 6:
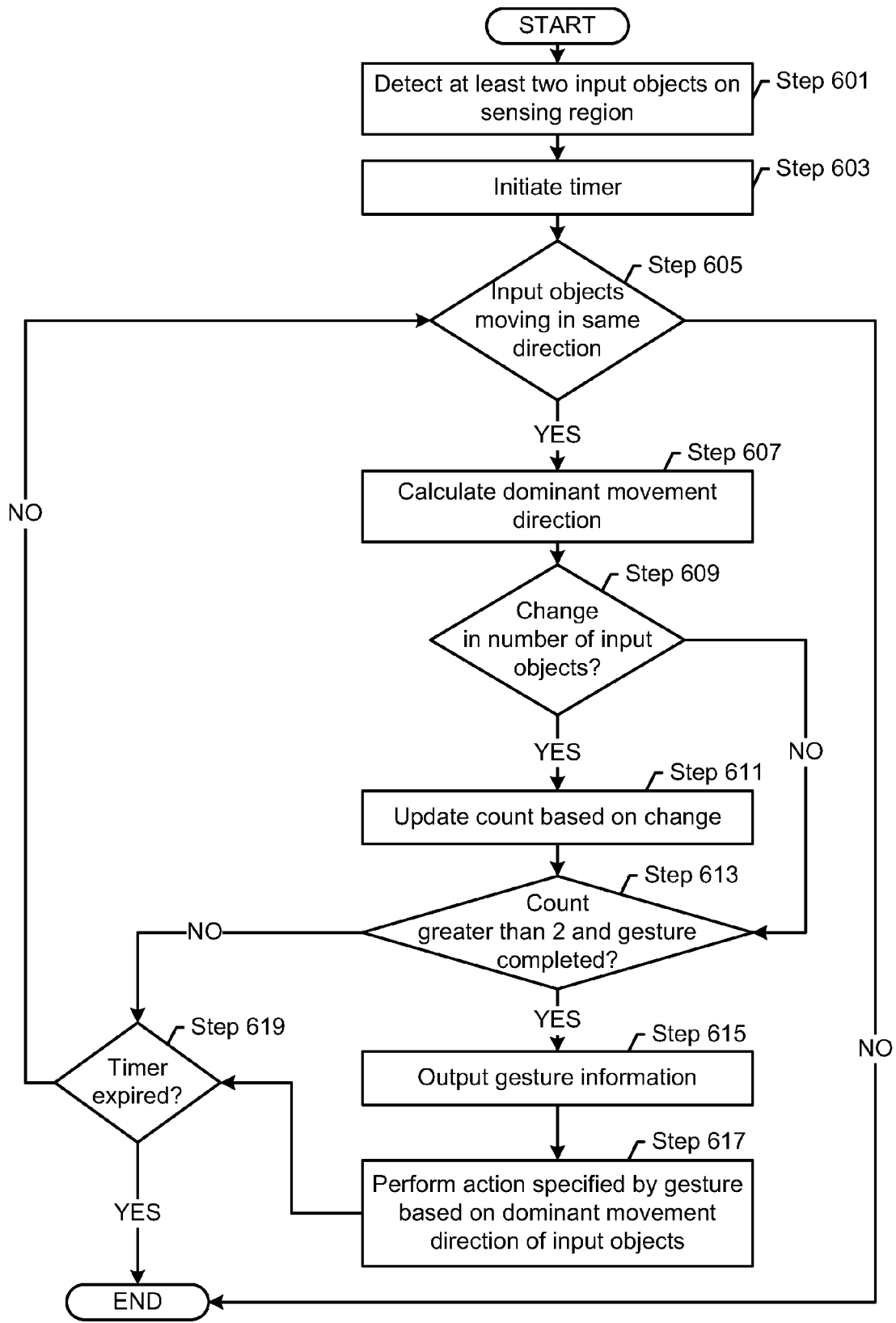

FIGS. 5 and 6 show examples of a swipe involving at least three inputs in accordance with one or more embodiments of the invention. Specifically, the swipe is a movement of specified number of input objects in the same dominant direction across a sensing region. The detection of the movement of all the input objects that are required for the swipe may or may not occur simultaneously or contemporaneously. The specified number of input objects may be three, four, five, six, etc. as defined by the gesture. If the specified number is more than three, then additional input objects may be detected on the input region that are not shown in FIG. 5, and the determination in STEP 613 of FIG. 6 may be that the specified number is detected rather than more than two.

FIG. 5 shows an example time-lapse diagram of an at least three input swipe. In FIG. 5, three collinear dots mean that more time periods optionally may exist between the first time period and the second time period.

As shown in FIG. 5, the sensing region (500) at the first time period (508) detects collinear input objects (514). In other words, input object A (510) and input object B (512) are substantially inline and moving in approximately the same direction (i.e., the dominant direction (506)). In one or more embodiments of the invention, by not requiring that the input objects are exactly collinear or movement in the exact same direction, embodiments allow for jitter of a user and natural variations between users. Rather than the input objects being collinear, the input objects may be in a substantially fixed position relative to each other. Input objects are in a substantially fixed position when only jitter exists between the input objects in one or more embodiments of the invention.

In FIG. 5, the movement of the input objects (514) define a leading end (502) and a final end (504). The leading end (502) and the final end (504) are with respect to the dominant direction (506) of movement of the input objects. Specifically, one or more of the input objects start at leading end (502) and move toward the final end (504). Although FIG. 5 shows the leading end as being the left side, and the final end as being the right side, the leading end may be the right side, the top, the bottom, a corner or another end while the final end may be opposite of the leading end.

Continuing with FIG. 5, the sensing region at the second time period (516) includes input object C (518) in the set of input objects (514). Input object C (518) also moves in the dominant direction (506) to complete the at least three input object swipe. As shown in FIG. 5, by allowing input object C (518) to not be on the sensing region at the start of the at least three input object swipe, embodiments effectively expand the size of the sensing region because input object A (510) and input object B (512) can both travel a greater distance across the sensing region. Further, if the sensing region were too small to fit all of input object A (510), input object B (512) and input object C (518), a user may still complete the at least three input object swipe because each of the input objects (514) are still capable of moving across the sensing region (500), albeit not simultaneously, and through the count value, the determination module is capable of detecting that three separate input objects moved across the sensing region (500).

Although FIG. 5 shows a large rectangular sensing region (500), the sensing region may be much smaller with respect to the size of the input objects. Further, the sensing region may be a different shape (e.g., square, rectangular with rounded edges, rectangular with different relative dimensions, etc.).

FIG. 6 shows a flowchart for an example method involving a gesture with at least three input objects in one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 601, at least two input objects are detected on the sensing region in one or more embodiments of the invention. Detecting the at least two input objects may be performed in a manner identical or similar to Step 401 in FIG. 4 discussed above.

In Step 603, a timer is initiated in one or more embodiments of the invention. Initiating the timer may be performed in a manner identical or similar to Step 603 in FIG. 4 discussed above.

In Step 605, a determination is made whether the input objects are moving in the same direction in one or more embodiments of the invention. The use of the term same direction includes when there is jitter or other offsets in the movement of the input objects. For example, when a user moves their fingers across a touchpad, the user's fingers may have some jitter or be not properly aligned. In one or more embodiments of the invention, determining whether input objects are moving in the same direction obtaining positional information defining the movement of each of the input objects during a first time period determining whether the trajectory of the movement is within an identical direction or with only a small offset from each other.

In Step 607, the dominant movement direction is calculated in one or more embodiments of the invention. The dominant movement direction may be calculated, for example, as the average of the movement directions of each of the input objects over time. The dominant movement direction accounts for possible jitter or an inability to move the input objects in a straight line.

In Step 609, a determination may be made whether a change in the number of input objects is detected. The determination in Step 609 may be made in response to determining that input objects are moving in the same direction. Alternatively, the determination in Step 609 may be independent of the determination in Step 605.

The determining in Step 609 may be determining whether a new input object is added, an existing input object is removed, or a previously removed input object is added. Sensor electrodes in direct or indirect communication with the determination module may be used to detect the new input object. Determining whether a new input object is detected may be performed as follows. Based on the dominant movement direction, a leading edge and a final edge of the sensing region are identified. A determination may be made whether a new input object is detected on the leading edge while other input objects on the sensing region move toward the final edge. A new input object is detected on the leading edge when the new input object is detected on the leading side of the other input objects on the sensing region. Thus, a new input object may not need to be located exactly on a physical edge or end of the sensing region as long as the new input objects relative position is toward the leading edge of the sensing region.

Determining whether an input object is removed from the sensing region may be performed as follows. The determination may be based on identifying the final end based on the dominant movement direction. The first input object that was detected on the sensing region as being the closest to and moving toward the final end may no longer be detected on the sensing region. In such a scenario, that input object is considered to be removed from the sensing region.

In one or more embodiments of the invention, the determination may be that a previously detected and removed input object is once again added to the sensing region. For example, such a scenario may occur if the swipe requires swipe back and forth. In such a scenario, when the dominant movement direction is detected as switching to an opposite direction, any new input objects may be assumed to be previously detected, removed, and once again added. Alternatively, a separate count may be maintained indicating the number of removed input objects and when the input object is once again detected, the separate count may be decremented. When the separate count is zero and an input object is newly detected, the input object may be considered to be newly added to the sensing region.

Continuing with FIG. 6, if the number of input objects changed, then the count is updated in Step 611 based on the change in one or more embodiments of the invention. Specifically, if a new input object is detected, then the count is incremented. If an input object is removed, the count remains the same and positional information indicating the last place in which the input object is detected is stored in one or more embodiments of the invention. If a previously detected and removed input object is newly detected, then the count may not be updated, but the positional information may be stored to reflect the new detection of the input object.

In Step 613, a determination is made whether the count is greater than two and a gesture is completed in one or more embodiments of the invention. Specifically, the determination module may access the counter to obtain the current count. Further, the determination module may compare positional information to determine whether the at least three input object swipe is completed.

If the count is greater than two and a completed gesture is detected, then the gesture information is submitted as output in Step 615. For example, if the controller is the determination module, then the controller may transmit a signal that the at least three input object swipe is complete to the input device driver. As another example, if the input device driver is the determination module, then the input device driver may transmit information identifying the at least three input object swipe to the operating system. In one or more embodiments of the invention, if the operating system is the determination module, the portion of the operating system that identifies the gesture may transmit the information identifying the gesture.

In Step 617, the action specified by the at least three input object swipe is performed based on the dominant movement of the input objects in one or more embodiments of the invention. In one or more embodiments of the invention, the operating system may perform the action.

Returning to Step 613, if the determination is made that the count is not greater than two and that a gesture is not identified, then the method continues. In Step 619, a determination is made whether the timer expired in one or more embodiments of the invention. Specifically, in one or more embodiments, the determination is made whether the maximum time allowed for the at least three input object swipe has elapsed. If the maximum time allowed has elapsed (i.e. the timer has expired), the method may end. Otherwise, the method may continue to Step 605 and receive positional information, update the count, and identify when the at least three input object swipe is completed.

Although FIG. 6 shows determining whether a gesture is being formed prior to completion of the gesture, rather than determining whether a gesture is being formed, embodiments may wait until after the timer expired, input objects are removed from the sensing region, or at another such time.

Further, although FIG. 6 may imply that the at least three input object swipe is possible and identified, in one or more embodiments of the invention, another gesture may be identified prior to completion of movement of input objects on the sensing region or expiration of the timer to complete the at least three input object swipe. In such a scenario, the action specified by the first gesture may be undone and the action specified by the at least three input object swipe may be performed.

FIGS. 7-11 show example uses of a gesture involving at least three input objects in accordance with one or more embodiments of the invention. Specifically, the at least three input object gesture in FIGS. 7-11 is a three finger swipe that, when completed, effectively increases the size of text on a screen based on the distance traveled across the sensing region. The example shown in FIGS. 7-11 is intended for example purposes only and not to limit the scope of the claims.

Figure 7:
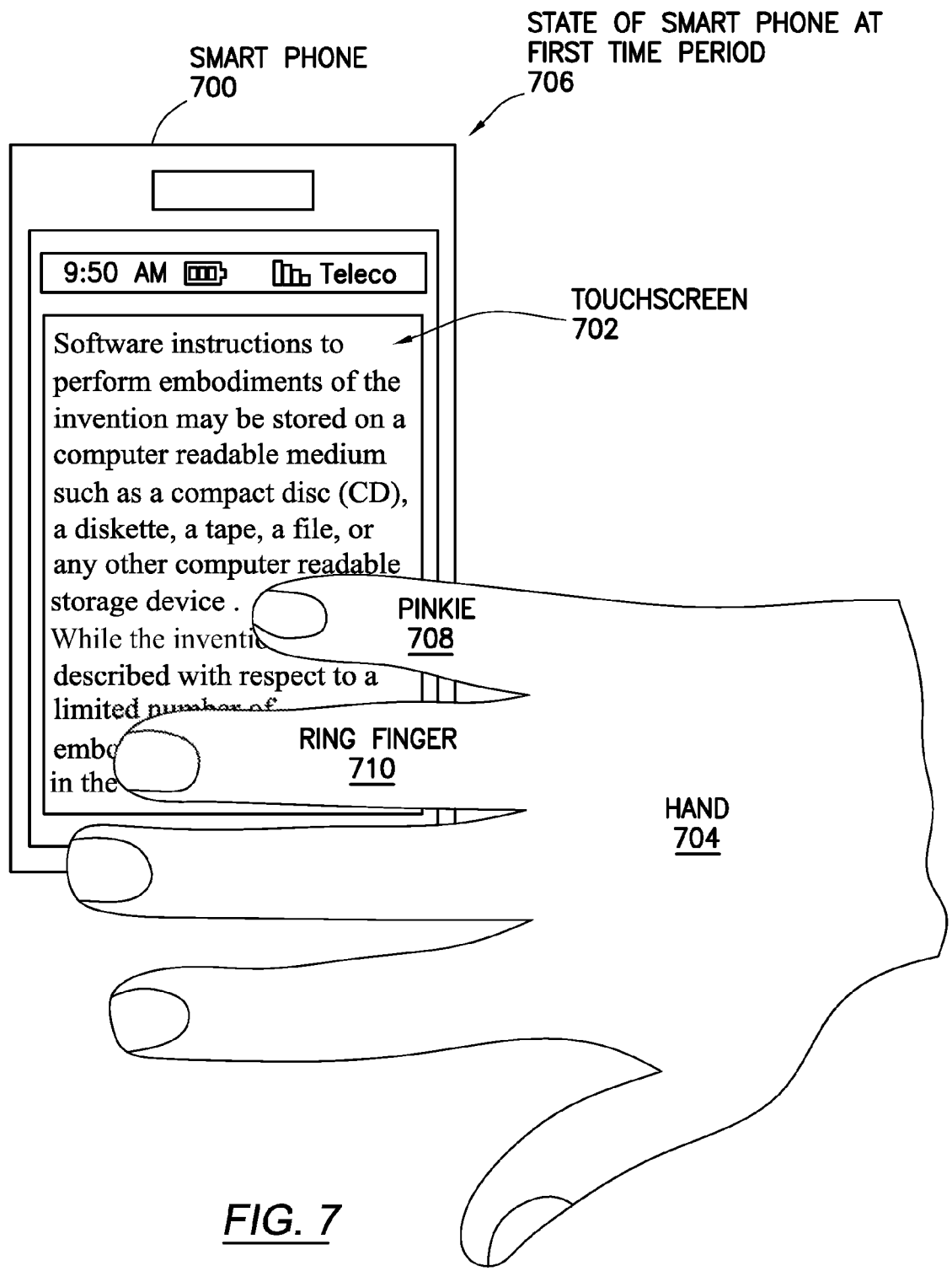
FIGS. 7-11 show example uses of a gesture in accordance with one or more embodiments of the invention.
Figure 8:
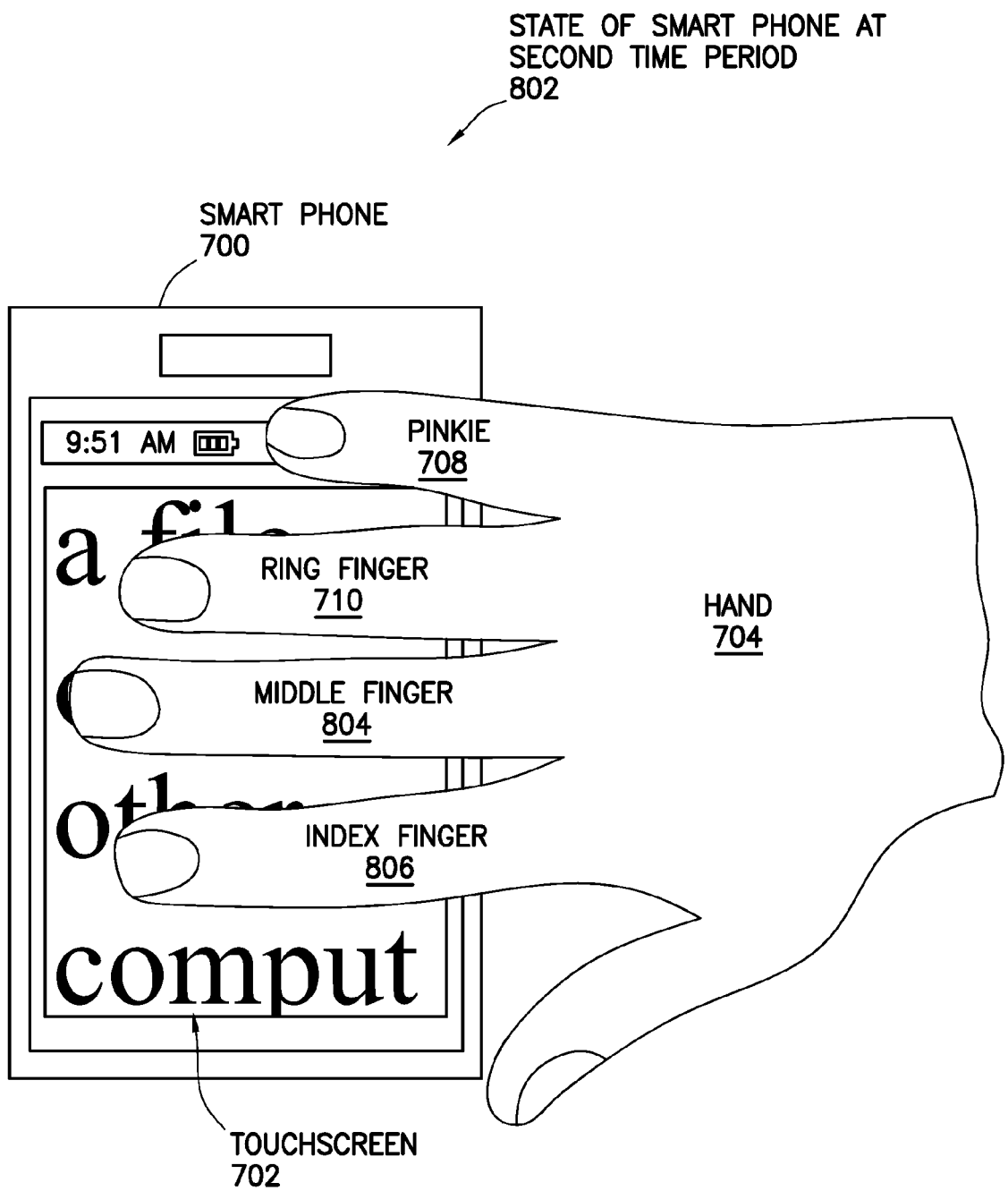

FIG. 7 and FIG. 8 show the four finger swipe on a smart phone (700). Specifically, the sensing region is the touchscreen (702) of the smart phone (700). A user slides their fingers of his right hand (704) across the touchscreen (702) to complete the four finger swipe.

Specifically, FIG. 7 shows the state of the smart phone (700) at a first time period (706). As shown in FIG. 7, the font size of the text shown on the touchscreen (702) is small. Further, two input objects (i.e., the pinkie (708) and ring finger (710) of a right hand (704)) are detected on the touchscreen (702). Although not explicitly shown in FIG. 7, the user is moving his pinkie finger (708) and ring finger (710) from the bottom of the touchscreen (702) to the top of the touchscreen (702).

FIG. 8 shows the state of the smart phone (700) at a second time period (802). As shown in FIG. 8, the pinkie finger (708) is no longer detected on the touchscreen (702). However, a middle finger (804) and an index finger (806) are detected on the touchscreen (702) and also move in the dominant movement direction (i.e., from the bottom of the touchscreen (702) to the top of the touchscreen (702)). Further, because four fingers of the right hand (704) were detected as moving in the dominant movement direction within the maximum time allowed for the four finger gesture, the four finger swipe is detected and the font size of the text displayed on the touchscreen in increased in accordance with the distance traveled as specified by the four finger swipe.

Additionally, as shown in FIG. 7, the relative size of the hand (704) with respect to the touchscreen (702) effectively prohibits the user from moving all fingers of his right hand at the same time on the touchscreen the distance desired to increase the text size the desired amount. However, embodiments are capable of determining that the total number of fingers on the touchscreen (702) was four during the gesture even though the number of fingers on the touchscreen (702) may not be four at any point in time. Further, embodiments allow for the pinkie (708), ring finger (710), middle finger (804), and index finger (806) of the right hand (704) to travel the full distance of the touchscreen (702) so that the text size is increased the desired amount by the user.

Figure 9:
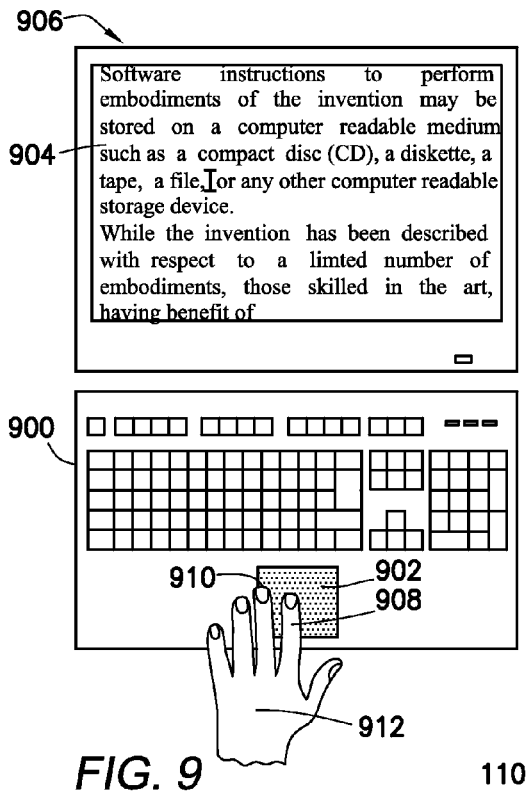
Figure 10:
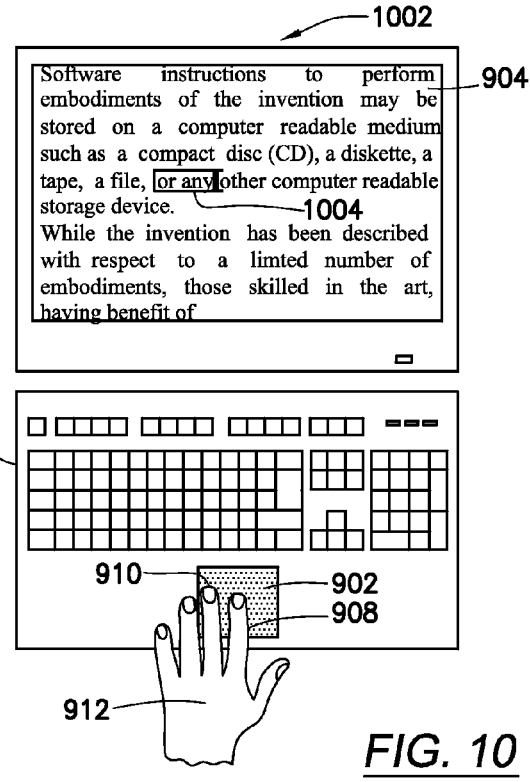
Figure 11:
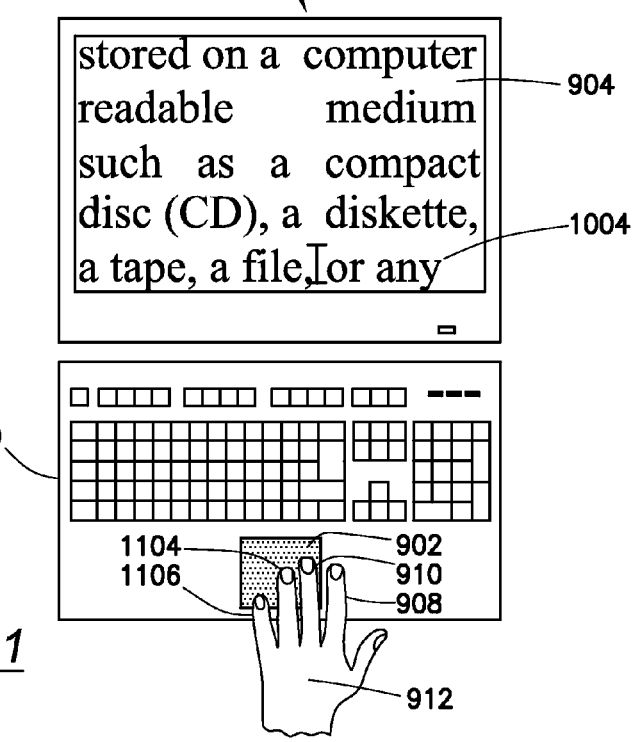

FIGS. 9-11 show an example of a four finger swipe on a touchpad of a mobile device. Specifically, the sensing region is the touchpad (902) of the laptop (900). A user slides her fingers of her left hand (912) across the touchpad (902) to complete the four finger swipe.

Specifically, FIG. 9 shows the state of the laptop (900) at a first time period (906). As shown in FIG. 9, the font size of the text shown on the display (904) is small. Further, two input objects (i.e., the index finger (908) and middle finger (910) of the left hand (912)) are detected on the touchpad (902). Although not shown in FIG. 9, the user is moving her index finger (908) and middle finger (910) of her left hand (912) from the left of the touchpad (902) to the right of the touchpad (902).

FIG. 10 shows the state of the laptop (900) at a second time period (1002). As shown in FIG. 10, the index finger (908) and middle finger (910) of the left hand (912) have moved. In the example, such movement is consistent with a two finger gesture defined to highlight text on the display (904). Accordingly, a portion of the text is highlighted (1004) on the display in response to the determination module in the laptop detecting a two finger gesture.

However, continuing with the example, FIG. 11 shows an example state of a laptop (900) at a third time period (1102). At the third time period, the maximum allowed time to complete the four finger gesture has not yet elapsed. Further, the index finger (908) is no longer detected on the touchpad (902). However, a ring finger (1104) and pinkie (1106) of the left hand are detected on the touchpad (902) and also move in the dominant movement direction (i.e., from the left of the touchpad (902) to the right of the touchpad (900)). Further, because four fingers of the left hand (912) were detected as moving in the dominant movement direction within the maximum time allowed for the four finger gesture, the four finger swipe is detected. Accordingly, the highlighting of the portion of text (1004) is undone such that the display (904) is in a state prior to the detection of the two finger swipe in FIG. 10. Further, the font size of the text on the display (904) of the laptop is increased in accordance with the distance traveled as specified by the four finger swipe.

Additionally, as shown in FIGS. 9-11, the relative size of the left hand (912) with respect to the touchpad (902) prohibits the user from moving all her fingers at the same time on the touchpad the distance desired to increase the text size the desired amount. However, embodiments are capable of determining that the total number of fingers on the touchpad (902) was four during the gesture even though the number of fingers on the touchpad (902) may not be four at any point in time. Further, embodiments allow for the index finger (908), middle finger (910), ring finger (1104), and pinkie (1106) of the left hand (912) to travel the full distance of the touchpad (902) so that the text size is increased the desired amount by the user.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting a gesture comprising:
    detecting a first input object, a second input object, and a movement of the first input object, a movement of the second input object in a sensing region during a first time period;
    detecting the first input object leaving the sensing region during a second time period, the second time period occurring after the first time period;
    detecting a third input object and movement for the third input object in the sensing region during a third time period, the third time period occurring after the first time period and after the second time period, and the third input object only detected after the first time period;
    identifying a first gesture based on the movement of the first input object, the movement of the second input object, and the movement of the third input object; and
    outputting gesture information identifying the first gesture,
    wherein the second input object remains in the sensing region for the first time period, the second time period, and at least a portion of the third time period.

2. The method of claim 1, further comprising:
    detecting a fourth input object in the sensing region and a movement of the fourth input object,
    wherein the first gesture is further identified based on the movement of the fourth input object.

3. The method of claim 1, further comprising:
    detecting the first input object in the sensing region during a fourth time period, the third time period being after the third time period,
    wherein the first gesture is further identified based on the detection of the first input object in the sensing region during the fourth time period.

4. The method of claim 1, further comprising:
    prior to the third time period:
        identifying a second gesture based on the movement of the first input object and the movement of the second input object, and
        performing the second gesture; and
    after detecting the third input object, rewinding performance of the second gesture based on detecting the third input object and identifying the first gesture.

5. The method of claim 1, wherein the first gesture is an at least three input object swipe.

6. The method of claim 5, further comprising:
   during the first time period, detecting a dominant movement direction based on the movement of the first input object and the movement of the second input object, wherein the second input object follows a path of the first input object in the dominant movement direction; and
   identifying a final edge and a leading edge corresponding to the dominant movement direction, wherein the dominant movement direction is from the leading edge to the final edge,
   wherein the at least three input object swipe is identified based on a starting position of detection of the third input object being at the leading edge and the movement of the third input object being in a same direction as the dominant movement direction.

7. A processing system for a sensing device, comprising:
   a sensor module comprising sensor circuitry coupled to a plurality of sensor electrodes, the sensor module configured to drive the sensor electrodes to sense input objects in a sensing region of the sensing device;
   a determination module configured to:
      detect a first input object, a second input object, and a movement of the first input object, a movement of the second input object in the sensing region during a first time period;
      detect the first input object leaving the sensing region during a second time period, the second time period occurring after the first time period;
      detect a third input object and movement for the third input object in the sensing region during a third time period, the third time period occurring after the first time period and after the second time period, and the third input object only detected after the first time period;
      identify a first gesture based on the movement of the first input object, the movement of the second input object, and the movement of the third input object; and
      output gesture information identifying the first gesture,
      wherein the second input object remains in the sensing region for the first time period, the second time period, and at least a portion of the third time period.

8. The processing system of claim 7, wherein the determination module comprises instructions executable by a processor which at least a part of a device driver for the sensing device.

9. The processing system of claim 7, further comprising:
   a clock,
   wherein the determination module is further configured to initiate a timer using the clock based on detecting the first input object and the second input object, and
   wherein identifying the first gesture is further based on a completion of the first gesture with the movement of the third input object prior to the expiration of the timer.

10. The processing system of claim 9, further comprising:
    a counter configured to count a total number of input objects detected in the sensing region between initiating the timer and the completion of the first gesture.

11. The processing system of claim 10, wherein the counter is defined in instructions of the determination module.

12. The processing system of claim 7, wherein the first input object, the second input object, and the third input object are each a finger.

13. The processing system of claim 7, wherein the sensing device is a touch pad.

14. The processing system of claim 7, wherein the sensing device is a touch screen.

15. A non-transitory computer readable medium for detecting a gesture, comprising computer readable program code embodied therein for:
    detecting a first input object, a second input object, and a movement of the first input object, a movement of the second input object in a sensing region during a first time period;
    detecting the first input object leaving the sensing region during a second time period, wherein the second time period is after the first time period;
    detecting a third input object and movement for the third input object in the sensing region during a third time period, the third time period occurring after the first time period and after the second time period, and the third input object only detected after the first time period;
    identifying a first gesture based on the movement of the first input object, the movement of the second input object, and the movement of the third input object; and
    outputting gesture information identifying the first gesture,
    wherein the second input object remains in the sensing region for the first time period, the second time period, and at least a portion of the third time period.

16. The non-transitory computer readable medium of claim 15, further comprising computer readable program code for:
    initiating a timer using the clock based on detecting the first input object and the second input object,
    wherein identifying the first gesture is further based on a completion of the first gesture with the movement of the third input object prior to the expiration of the timer.

17. The non-transitory computer readable medium of claim 15, further comprising computer readable program code for:
    maintaining a count of a total number of input objects on the sensing region prior to completion of the first gesture,
    wherein the first gesture is identified based on the count.

18. The non-transitory computer readable medium of claim 15, wherein the first gesture is an at least three input object swipe.

19. The non-transitory computer readable medium of claim 18, further comprising computer readable program code for:
    during the first time period, detecting a dominant movement direction based on the movement of the first input object and the movement of the second input object, wherein the second input object follows a path of the first input object in the dominant movement direction; and
    identifying a final edge and a leading edge corresponding to the dominant movement direction, wherein the dominant movement direction is from the leading edge to the final edge,
    wherein the at least three input object swipe is identified based on a starting position of detection of the third input object being at the leading edge and the movement of the third input object being in a same direction as the dominant movement direction.

* * * * *

UNITED STATES PATENT AND TRADEMARK OFFICE
CERTIFICATE OF CORRECTION

PATENT NO. : 9,063,575 B2
APPLICATION NO. : 13/722870
DATED : June 23, 2015
INVENTOR(S) : Mark Andrew Huie Page 1 of 1

It is certified that error appears in the above-identified patent and that said Letters Patent is hereby corrected as shown below:

In the Claims:

At column 18, claim number 3, line number 3, "third" should read --fourth--

Signed and Sealed this
Twelfth Day of April, 2016

Michelle K. Lee
*Director of the United States Patent and Trademark Office*